United States Patent
Melaragni et al.

(10) Patent No.: US 9,598,008 B2
(45) Date of Patent: Mar. 21, 2017

(54) PHONE LEFT IN BIN NOTIFICATION SYSTEM AND METHOD

(71) Applicant: GM GLOBAL TECHNOLOGY OPERATIONS LLC, Detroit, MI (US)

(72) Inventors: Michael J. Melaragni, Rochester, MI (US); Dan V. Lascu, Farmington Hills, MI (US); Mark R. Willey, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/806,799

(22) Filed: Jul. 23, 2015

(65) Prior Publication Data

US 2017/0021763 A1    Jan. 26, 2017

(51) Int. Cl.
| | |
|---|---|
| *B60Q 1/00* | (2006.01) |
| *B60Q 9/00* | (2006.01) |
| *B60Q 5/00* | (2006.01) |
| *B60L 1/00* | (2006.01) |
| *B60R 1/00* | (2006.01) |
| *H02J 7/02* | (2016.01) |
| *H02J 7/00* | (2006.01) |

(52) U.S. Cl.
CPC .............. *B60Q 9/00* (2013.01); *B60L 1/00* (2013.01); *B60Q 5/005* (2013.01); *B60R 1/00* (2013.01); *H02J 7/025* (2013.01); *H02J 7/027* (2013.01); *B60R 2300/80* (2013.01); *H02J 2007/0096* (2013.01)

(58) Field of Classification Search
CPC ........ G08B 21/24; H02J 7/025; H02J 7/0044; H02J 7/0047; H02J 7/027; B60Q 9/00; B60Q 5/005; B60L 1/00; B60R 1/00
USPC ........... 340/457, 539.32, 539.13, 568.1, 571; 455/573, 90.3; 320/114, 115
See application file for complete search history.

(56) References Cited

U.S. PATENT DOCUMENTS

| | | | | |
|---|---|---|---|---|
| 2006/0290319 A1* | 12/2006 | Burgan | ................... | B60R 11/02 320/104 |
| 2013/0012123 A1* | 1/2013 | DeLuca | ................. | A45C 13/18 455/39 |
| 2013/0278415 A1* | 10/2013 | Morgan, Jr. | .......... | H04W 4/046 340/539.13 |
| 2014/0248863 A1* | 9/2014 | Golsch | .................. | H04W 4/001 455/418 |
| 2015/0061856 A1* | 3/2015 | Raman | ................... | G08B 21/24 340/457 |
| 2015/0220897 A1* | 8/2015 | Weatherdon | ........... | G06Q 20/18 705/14.73 |

(Continued)

*Primary Examiner* — Thomas Mullen
(74) *Attorney, Agent, or Firm* — Quinn Law Group, PLLC

(57) ABSTRACT

A notification system for notification of a vehicle operator that an electronic device is in a bin when a triggering event occurs includes a bin, a charging device for charging the electronic device when the electronic device is in the bin, and a controller. The controller is in communication with the charging device and includes a processor and tangible, non-transitory memory on which is recorded instructions to provide a notification to the vehicle operator when the electronic device is in the bin and the triggering event occurs. The triggering event may be a transition of a vehicle electrical power system to an ignition off mode. The charging device may be an inductive charging device.

17 Claims, 2 Drawing Sheets

(56) References Cited

U.S. PATENT DOCUMENTS

2015/0248830 A1* 9/2015 Okano .................... H02J 17/00
340/539.11

* cited by examiner

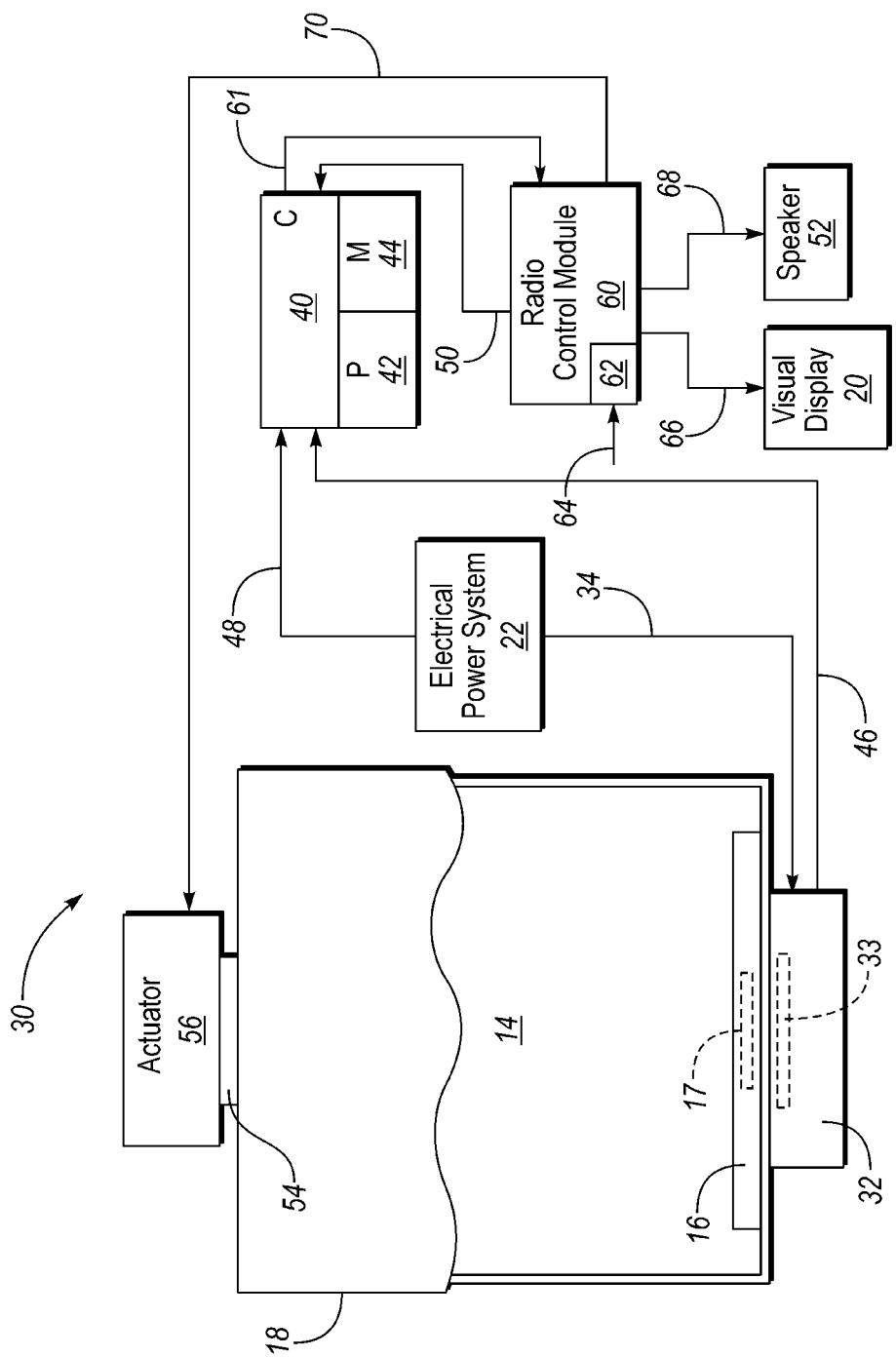

PHONE LEFT IN BIN NOTIFICATION SYSTEM AND METHOD

TECHNICAL FIELD

The present disclosure relates to a system and method for providing notification when a phone is left in a bin.

BACKGROUND

A vehicle typically includes one or more bins or compartments for storage of small items such as maps, tools, phones, etc. The bin may include a cover for containing the items, for functional purposes, and/or for aesthetic purposes. The bin may be configured to charge a phone and/or other electronic devices when the phone and/or other electronic devices are stored in the bin while the vehicle is being operated. However, on exiting the vehicle, the driver may forget that his phone is in the bin and may unintentionally leave it in the vehicle.

SUMMARY

A notification system and a method are disclosed herein. The notification system is for notifying a vehicle operator that an electronic device is in a bin when a triggering event occurs. The notification system includes a bin, a charging device, and a controller. The bin is for storage of the electronic device. The charging device is connected to the bin and is for charging the electronic device when the electronic device is in the bin. The controller is in communication with the charging device and includes a processor and tangible, non-transitory memory on which is recorded instructions to provide a notification to the vehicle operator when the electronic device is in the bin and the triggering event occurs. The triggering event may be a transition of a vehicle electrical power system to an ignition off mode. The charging device may be an inductive charging device.

The method notifies a vehicle operator that an electronic device is in a bin when a triggering event occurs. The method includes: determining, via a controller, if the electronic device is in the bin when the triggering event occurs; and notifying the vehicle operator, via the controller, that the electronic device is in the bin when the triggering event occurs. Detecting, via the controller, the electronic device in the bin may include receiving a charging signal from a charging device connected to the bin for charging the electronic device when the electronic device is in the bin. The charging device may be an inductive charging device.

The notification system and method disclosed herein may reduce or eliminate instances when the vehicle operator forgets that his electronic device is stored and charging in the bin and unintentionally leaves it in the vehicle. The notification system and method disclosed herein applies to any machine or manufacture that includes a bin or compartment where an electronic device may be stored and charged.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 2 is a schematic illustration of the notification system of FIG. 1.

DETAILED DESCRIPTION

Figure 1:
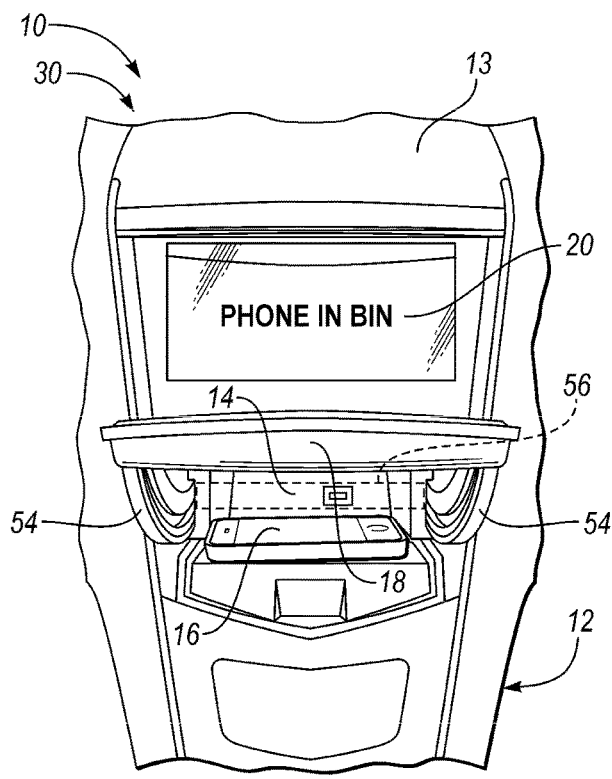
FIG. 1 is a fragmentary schematic perspective illustration of a vehicle having a bin for storage and charging of an electronic device and a notification system for notifying a vehicle operator that an electronic device is in a bin when a vehicle electrical power system transitions to an ignition off mode.

Referring to the drawings, wherein like reference numbers refer to like components, FIG. 1 shows a portion of a vehicle 10 including an interior 12 having a dash assembly 13. The vehicle 10 is operated by a vehicle operator (not shown) and includes a compartment or bin 14 in the interior 12 for storage of an electronic device 16 and/or other items. The bin 14 may be an integrated center stack bin in the dash assembly 13, as shown, or may be a front or rear center console bin, a glove box in the dash assembly 13, a front or rear passenger door bin, or any other bin in the vehicle interior 12. The bin 14 may have a bin cover or door 18 that is closable for aesthetic and/or functional purposes. Alternatively, the bin 14 may be an open container without a bin cover or door. The door 18 may be closable, as shown, when the electronic device 16 is charging in the bin 14. The vehicle 10 may include a visual display 20 for communication of information to the operator. The electronic device 16 may be a phone, as shown, or may be any other electronic device. The electronic device 16 may include an inductive charge receiving coil 17.

The vehicle 10 includes an electrical power system 22. The vehicle electrical power system 22 has an ignition off mode, and may have other modes, such as an ignition on mode, an accessory power on mode, an ignition and accessory power off mode, and any other electrical power mode necessary for operation of the vehicle 10 The vehicle 10 includes a notification system 30 for notifying the vehicle operator that the electronic device 16 is in the bin 14 when a triggering event occurs. The triggering event may be a transition of the vehicle electrical power system 22 to the ignition off mode. Other non-limiting examples of triggering events include shifting of a vehicle transmission system (not shown) to a park mode, applying a parking brake (not shown), opening a vehicle operator door (not shown), and opening a passenger door (not shown).

Referring now to FIG. 2, the notification system 30 includes the bin 14, a charging device 32, and a controller (C) 40. The bin 14 is for storage of the electronic device 16. The charging device 32 is connected to the bin 14 and is for charging an energy storage device (not shown) in the electronic device 16 when the electronic device 16 is in the bin 14. The charging device 32 may include an inductive charge sending coil 33 and may be an inductive charging device, as shown, or may be any other wireless charging device which charges the electronic device 16 without a wire connection between the electronic device 16 and the charging device 32. Alternatively, the charging device 32 may require a wire connection between the electronic device 16 and the charging device 32. The charging device 32 may receive power (arrow 34) from the vehicle electrical power system 22. The charging device 32 may send a charging signal (arrow 46) to the controller 40 when the electronic device 16 is charging in the bin 14. The charging signal 46 may be sent to the controller 40 via a wire or wireless connection.

The controller 40 may be embodied as a computer device having a processor (P) 42 and memory (M) 44. Instructions embodying a method 100 are recorded on the memory 44 and are selectively executed by the processor 42 such that the controller 40 is programmed to execute all necessary steps of the method 100. The method 100 for notifying the vehicle operator that the electronic device 16 is in the bin 14 when the vehicle electrical power system 22 transitions to an ignition off mode is described below with reference to FIG. 3.

Input signals (arrows 46, 48, 50) that drive the control steps executed by the controller 40 may be internally generated by the controller 40, e.g., as in the execution of the method 100 (not shown); may include sensed information, e.g., as in a charging signal (arrow 46) received from the charging device 32 when the electronic device 16 is in the bin 14 and charging, and a power mode signal (arrow 48) received from the vehicle electrical power system 22 when the vehicle electrical power system 22 transitions to the ignition off mode; and/or may include commands from the vehicle operator, e.g., as in a notification selection signal (arrow 50). Other input signals, including input signals indicating the occurrence of alternative triggering events, may be received as appropriate.

The memory 44 may include tangible, non-transitory, computer-readable media such as read only memory (ROM), electrically-programmable read-only memory (EPROM), optical and/or magnetic media, flash memory, etc. Such memory is relatively permanent, and thus may be used to retain values needed for later access by the processor 42. Memory 44 may also include sufficient amounts of transitory memory in the form of random access memory (RAM) or any other non-transitory media. Memory 44 may also include any required position control logic, such as proportional-integral (PI) or proportional-integral-derivative (PID) control logic, one or more high-speed clocks, timers, analog-to-digital (A/D) circuitry, digital-to-analog (D/A) circuitry, a digital signal processor, and the necessary input/output (I/O) devices and other signal conditioning and/or buffer circuitry.

In operation, the controller 40 is in communication with the charging device 32 and includes the processor 42 and the tangible, non-transitory memory 44 on which is recorded instructions for an action to take when the electronic device 16 is charging in the bin 14 and the triggering event occurs. The controller 40 is programmed to execute the instructions from the memory 44 via the processor 42 when the electronic device 16 is charging in the bin 14 and the triggering event occurs to provide a notification to the operator that the electronic device 16 is in the bin 14.

The notification system 30 may include the visual display 20, and the notification to the vehicle operator may be a visible message displayed on the visual display 20. Non-limiting examples of the visual message include a written message, an icon, a flashing light, and a movement of a part of the vehicle 10. The notification system 30 may include a speaker 52, and the notification to the vehicle operator may be an audible sound emitted from the speaker 52. Non-limiting examples of the audible sound include a chime sound, a bell sound, a musical sound, and a buzzing sound. The speaker 52 may be a vehicle horn (not shown) and the audible sound may be a sounding of the vehicle horn. The bin 14 may include a hinge 54. The bin 14 may include an actuator 56 for opening the door 18. The actuator 56 may open the door 18 by pivoting the door 18 on the hinge 54, as best seen in FIG. 1. Alternatively, the actuator 56 may open the door 18 by releasing a latch (not shown), or by any other suitable method. The notification to the vehicle operator may be an opening of the door 18 via the actuator 56. Other notifications to the vehicle operator may be used, including but not limited to other types of visual notification, other types of audible notification, and tactile notifications, including but not limited to a vibrating seat notification and a vibrating steering wheel notification.

The notification to the vehicle operator may be a selectable one of a plurality of selectable notifications. For example, the vehicle operator may select one of the visual message displayed on the visual display 20, the audible sound emitted from the speaker 52, and the opening of the door 18 via the actuator 56 notifications. The notification to the vehicle operator may be a selectable plurality of a plurality of selectable notifications. For example, the vehicle operator may select two or more of the visual message displayed on the visual display 20, the audible sound emitted from the speaker 52, and the opening of the door 18 via the actuator 56 notifications.

The notification to the vehicle operator may continue until the vehicle electrical power system 22 transitions from the ignition off mode to an accessory power off mode. For example, the notification to the vehicle operator may continue from when the vehicle electrical power system 22 transitions to the ignition off mode until the vehicle operator opens a vehicle door (not shown) to exit the vehicle 10.

The notification system 30 may include a radio control module 60 having a human-machine interface 62 for two-way communication between the vehicle operator and the radio control module 60. The human-machine interface 62 may include a touch screen, a push button, a voice command device, and/or any other suitable means of allowing the vehicle operator to input a notification selection input (arrow 64) to the notification system 30. The vehicle operator may select one or more notifications using the human-machine interface 62. For example, the vehicle operator may select one or more of the visual message displayed on the visual display 20, the audible sound emitted from the speaker 52, and the opening of the door 18 via the actuator 56 notifications.

The radio control module 60 may send the notification selection signal (arrow 50) to the controller 40 corresponding to the notification selection input (arrow 64). The controller 40 may send a radio control module command signal (arrow 61) to the radio control module 60. The radio control module 60 may send one or more of output signals (arrows 66, 68, 70), as shown, corresponding to the notification selection input (arrow 64). Alternatively, the controller 40 may send one or more of the output signals (arrows 66, 68, 70) corresponding to the notification selection input (arrow 64). A visual notification signal 66 may be sent to the visual display 20 to command the visual display 20 to display the visual message. An audible notification signal 68 may be sent to the speaker 52 to command the speaker 52 to emit the audible sound. A door opening notification signal 70 may be sent to the actuator 56 to command the actuator 56 to open the bin door 18. The controller 40 may include the radio control module 60.

Figure 3:
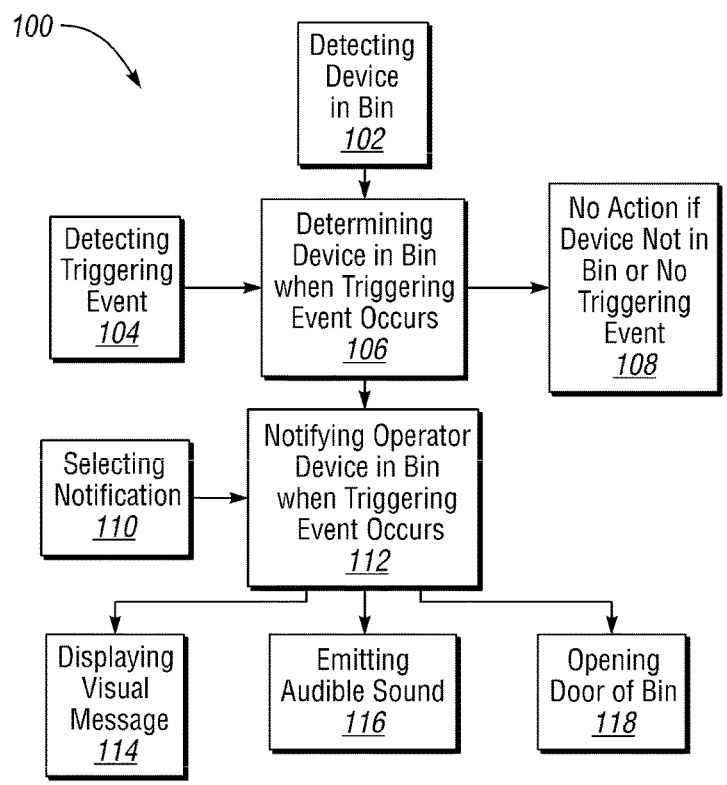
FIG. 3 is a flowchart depicting an example method for notification of a vehicle operator that an electronic device is in a bin when a vehicle electrical power system transitions to an ignition off mode, using the notification system shown in FIG. 2.

Referring now to FIG. 3, an example method 100 for operating the notification system 30, described above, commences with step 102. At step 102, the electronic device 16 is detected, via the controller 40, in the bin 14. Step 102 may include receiving the charging signal (arrow 46) from the charging device 32 connected to the bin 14 for charging the electronic device 16 when the electronic device 16 is in the bin 14. The charging device 32 may be an inductive charging device or any other wireless or wired charging device, as appropriate.

At step 104, the triggering event is detected, via the controller. The triggering event may be the transition of the vehicle electrical power system 22 to the ignition off mode. The transition of the vehicle electrical power system 22 to the ignition off mode may be from the ignition on mode. Step 104 may include receiving the power mode signal (arrow 48) from the vehicle electrical power system 22. Other non-limiting examples of triggering events include shifting of the vehicle transmission system to the park mode, applying the parking brake, opening of the vehicle operator door, and opening one of the vehicle passenger doors.

At step 106, the controller 40 determines if the electronic device 16 is in the bin 14 when the triggering event occurs. The triggering event may be a transition of the vehicle electrical power system 22 to the ignition off mode. At step 108, no action may be taken by the controller 40 if the electronic device 16 is not detected in the bin 14 or if the triggering event does not occur.

The method 100 may include step 110. At step 110, the vehicle operator may select the notification. Step 110 may include selection of one or more of a plurality of notifications. The plurality of notifications may include one of the visible message, the audible sound, the opening of the door 18 of the bin 14, and the tactile message. Selection of one or more of the plurality of notifications may include receiving the notification selection signal (arrow 50) from the radio control module 60 that includes the human machine interface 62.

At step 112, the vehicle operator is notified, via the controller 40, that the electronic device 16 is in the bin 14 when the vehicle electrical power system 22 transitions to the ignition off mode. Step 112 may include sending the visual notification signal (arrow 66) to the visual display 20 to command the visual display 20 to display the visible message. Step 112 may include sending the audible notification signal (arrow 68) to the speaker 52 to command the speaker 52 to emit the audible sound. Step 112 may include sending a door opening notification signal (arrow 70) to the actuator 56 to command the actuator 56 to open the door 18 of the bin 14.

The method 100 may include step 114. At step 114, the visual message may be displayed on the visual display 20. The method 100 may include step 116. At step 116, the audible sound may be emitted from the speaker 52. The method may include step 118. At step 118, the door 18 of the bin 14 may be opened.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A notification system for a vehicle for notifying a vehicle operator that an electronic device is in a bin when a triggering event occurs, the notification system comprising:
   a bin for storage of the electronic device, the bin including a door that is closable when the electronic device is in the bin and an actuator for opening the door;
   a charging device connected to the bin for charging the electronic device when the electronic device is in the bin; and
   a controller in communication with the charging device and including a processor and tangible, non-transitory memory on which is recorded instructions to provide a notification to the vehicle operator when the electronic device is in the bin and the triggering event occurs;
   wherein the charging device is configured to send a charging signal to the controller to indicate when the electronic device is in the bin; and
   wherein the notification to the vehicle operator includes an opening of the door via the actuator.

2. The notification system of claim 1, wherein the triggering event is a transition of a vehicle electrical power system to an ignition off mode.

3. The notification system of claim 1, wherein the charging device is an inductive charging device.

4. The notification system of claim 1, further comprising a visual display;
   wherein the notification to the vehicle operator further includes a visible message displayed on the visual display.

5. The notification system of claim 1, further comprising a speaker; wherein the notification to the vehicle operator further includes an audible sound emitted from the speaker.

6. The notification system of claim 1, wherein the notification to the vehicle operator further includes a selectable one of a plurality of selectable notifications.

7. The notification system of claim 1, wherein the notification to the vehicle operator further includes a selectable plurality of a plurality of selectable notifications.

8. The notification system of claim 1, further comprising a radio control module having a human-machine interface.

9. A method for notification of a vehicle operator that an electronic device is in a bin when a triggering event occurs, the method comprising:
   determining, via a controller, that the electronic device is in the bin when the triggering event occurs by receiving a charging signal from a charging device to determine when the electronic device is in the bin; and
   notifying the vehicle operator, via the controller, that the electronic device is in the bin when the triggering event occurs;
   wherein notifying the vehicle operator, via the controller, that the electronic device is in the bin when the triggering event occurs includes sending a door opening notification signal to an actuator to command the actuator to open a door of the bin.

10. The method of claim 9, wherein the triggering event is a transition of a vehicle electrical power system to an ignition off mode.

11. The method of claim 9, wherein determining, via the controller, that the electronic device is in the bin includes receiving a charging signal from a charging device connected to the bin for charging the electronic device when the electronic device is in the bin.

12. The method of claim 11, wherein the charging device is an inductive charging device.

13. The method of claim 9, wherein notifying the vehicle operator, via the controller, that the electronic device is in the bin when the triggering event occurs further includes sending a visual notification signal to a visual display to command the visual display to display a visible message.

14. The method of claim 9, wherein notifying the vehicle operator, via the controller, that the electronic device is in the bin when the triggering event occurs further includes sending an audible notification signal to a speaker to command the speaker to emit an audible sound.

15. The method of claim 9, further comprising detecting, via the controller, a selection of one of a plurality of notifications by the vehicle operator.

16. The method of claim 15, wherein the plurality of notifications includes one of a visible message and an audible sound.

17. The method of claim 15, wherein detecting, via the controller, the selection of one of the plurality of notifications by the vehicle operator includes receiving an operator selection signal from a radio control module having a human-machine interface.

\* \* \* \* \*